United States Patent
Zhang et al.

(10) Patent No.: US 9,822,017 B1
(45) Date of Patent: Nov. 21, 2017

(54) PROCESS FOR THE PREPARATION OF TITANIUM DIOXIDE NANORODS

(71) Applicant: U.S. Army Edgewood Chemical and Biological Center, APG, MD (US)

(72) Inventors: Dajie Zhang, Baltimore, MD (US); Brendan S. DeLacy, Havre de Grace, MD (US); Zachary B Zander, Havre de Grace, MD (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 92 days.

(21) Appl. No.: 15/151,987

(22) Filed: May 11, 2016

(51) Int. Cl.
*C01G 23/053* (2006.01)

(52) U.S. Cl.
CPC ........ *C01G 23/053* (2013.01); *C01P 2004/16* (2013.01)

(58) Field of Classification Search
CPC .......................... C01G 23/053; C01P 2004/16
See application file for complete search history.

(56) References Cited

U.S. PATENT DOCUMENTS 5,776,239 A * 7/1998 Bruno ...................... A61K 8/19
106/425

FOREIGN PATENT DOCUMENTS

WO    WO 2015147398 A1 * 10/2015 ........... C01G 23/053

* cited by examiner

*Primary Examiner* — Melvin C Mayes
*Assistant Examiner* — Michael Forrest
(74) *Attorney, Agent, or Firm* — Ulysses John Biffoni

(57) ABSTRACT

The present invention relates to a process for preparing high aspect ratio titanium dioxide ($TiO_2$) nanorods using a one-pot hydrothermal technique. Reaction additives of oxalic acid and sodium hydroxide (NaOH) are used to promote the conversion of titanium dioxide precursors, preferably tetraisopropoxide (TTIP), into a one-dimensional $TiO_2$ morphology.

15 Claims, 2 Drawing Sheets

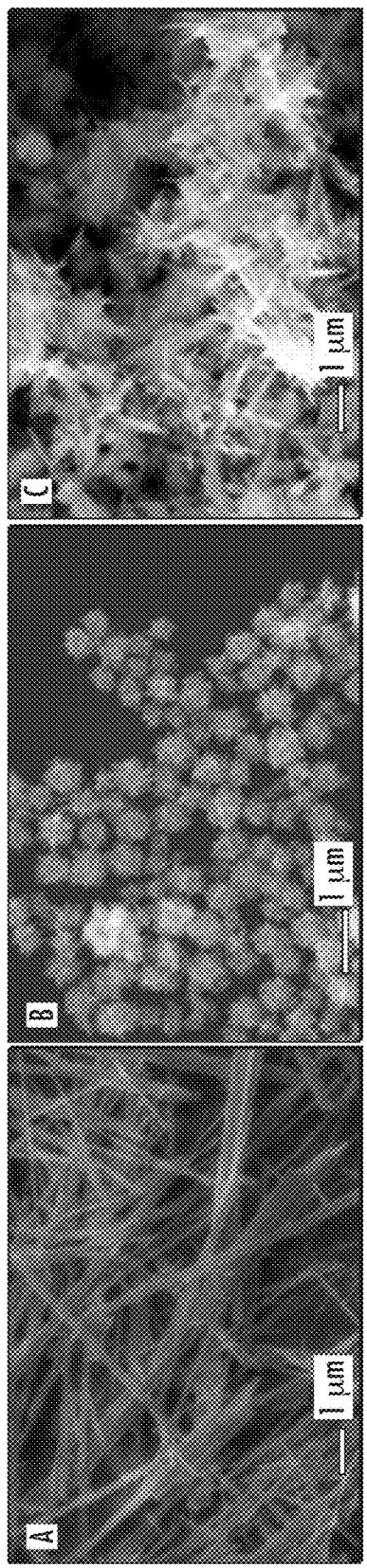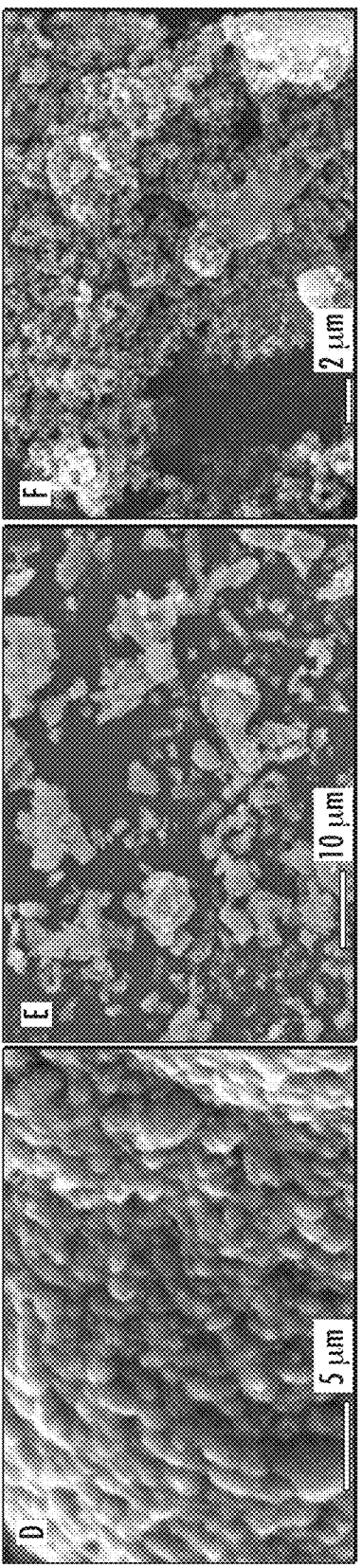

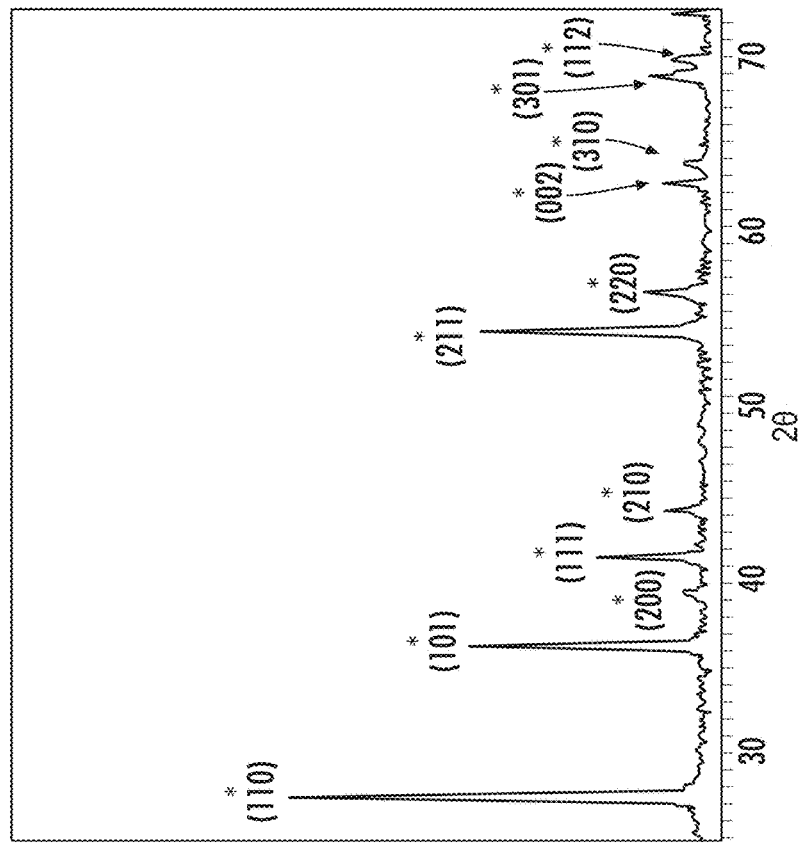
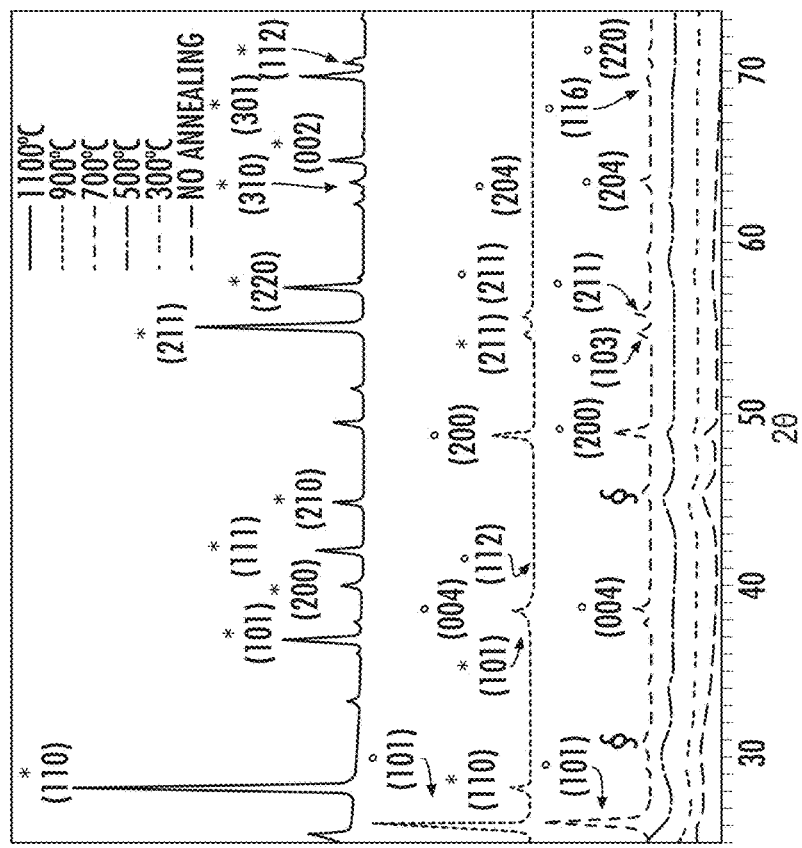
FIG. 2A
FIG. 2B

PROCESS FOR THE PREPARATION OF TITANIUM DIOXIDE NANORODS

GOVERNMENT INTEREST

The invention described herein may be manufactured, used, and/or licensed by or for the United States Government.

FIELD OF THE INVENTION

The invention relates to a process for the preparation of titanium dioxide structures and more specifically to the production of titanium dioxide nanorods. The process includes the reaction of a titanium dioxide precursor in the presence of oxalic acid and sodium hydroxide (NaOH). The titanium dioxide precursor preferably comprises titanium tetraisopropoxide (TTIP) which is converted into a one-dimensional $TiO_2$ morphology.

BACKGROUND OF THE INVENTION

Titanium dioxide ($TiO_2$), or titania, is a wide bandgap semiconductor material that is inexpensive, chemically stable, and has negligible absorption in the visible region. A particularly intriguing property of this material is its tendency to generate electron-hole pairs upon irradiation with UV light. This process provides a means of inducing chemical reactions at the surface of the material. $TiO_2$ is often utilized as a photocatalyst, an electrode in dye-sensitized solar cells, as a gas sensor, and as a decontamination agent.

The generation of electron-hole pairs and the subsequent transport of charge through the particle network are significant factors in determining whether or not $TiO_2$ is an efficient catalyst or electrode (Diebold U, Surf. Science Rep., 2002; 48; 53-229). The efficiency of titania as a catalyst or electrode is maximized when charge transport is significantly faster than hole-charge recombination. For example, when $TiO_2$ is used as an electrode in dye sensitized solar cells, charge transport has been found to be highly dependent on the morphology associated with the particle network. The number of inter-particle connections, or the lack thereof, can lead to hole-charge recombination (Zhu K, Neale N R, Miedaner A, Frank A J, Nano Letter 2007; 7:69). One approach to mitigating insufficient inter-particle connections has been the use of one-dimensional $TiO_2$ nanostructures, which maximize charge transport along the major dimension.

Conventional approaches used to synthesize $TiO_2$ nanorods include electrochemical anodization, hydrothermal synthesis, and template-assisted synthesis.

Hydrothermal synthesis, in particular, has been found to be a highly versatile approach to fabricating various types of nanocrystals. This technique is scalable and provides experimental control of temperature within the pressurized vessel. Numerous attempts to fabricate $TiO_2$ nanorods and nanotubes have been reported using this technique. These approaches primarily involve the treatment of pre-synthesized $TiO_2$ nanoparticles with sodium hydroxide (NaOH), resulting in the formation of lamellar sheets via the rupture of Ti—O—Ti bonds (Kasuga T, Hiramatsu M, Hoson A, Sekino T, Hiihara K. Adv. Materl. 2004, 16, 2052). Subsequent washing steps with water and acid, which remove the electrostatic charge within the sheets, were found to lead to the formation of nanotubes and nanorods. Zhang et al. describe a simple chemical/hydrothermal approach to fabricating $TiO_2$ nanowires with diameters from 30 to 45 nm and lengths of several micrometers (Zhang X Y, Li G H, Jin Y X, Zhang Y, Zhang J, Zhan L D. Chem. Physics Lett. 2002; 365:300).

In conjunction with the hydrothermal approach, several additives have also been explored as a means of inducing the formation and elongation of $TiO_2$ nanotubes, nanorods, and nanowires during the hydrothermal process. These additives include oleic acids, oleylamine, and tetraalkylammonium cations (Zhang Z, Zhong X, Liu S, Li D, Han M. Angew Chem. 2005; 44:3466) (Seo J W, Jun Y W, Ko S J, Cheon J. J. Phs. Chem. B 2005; 109:5389) (Chemseddine A, Mortiz T. Eur. J. Inorg. Chem 1999; 1999:235). Oxalic acid has been used as a means of complexing with metal cations while also promoting the formation of linear crystal structures in other metal oxides, including MgO and $WO_3$ (Mastuli M S, Jamarulzaman N, Nawawi M A, Mahat A M, Rusdi R, Kamarudin N, Nanoscale Res. Lett. 2014; 9:134) (Rao C N R, Natarajan Sm Vaidhyanathan R. Angew. Chem., Int. Ed 2004; 43:1466). In Mastuli et al., it was postulated that the formation of a metal cation-oxalate complex precedes the subsequent formation of a linear polymer network of Mg—$C_2O_4$, before forming the eventual MgO nanowires. Dambournet et al. describe the use of oxalate anions to complex with titanium atoms, which yielded titanium oxalate hydrate, $Ti_2O_3$ ($H_2O$) ($C_2O_4$)—$H_2O$ (Dambournet D, Belharouak I, Amine K. Chem. Mater. 2010; 22:1173). Upon annealing at 300° C., egg shaped $TiO_2$ particles were obtained. A metal:oxalate ratio of 1:2, was determined to be optimal for the formation of rutile crystals.

As described in U.S. Pat. No. 9,085,467 $TiO_2$ has various crystalline shapes. The most common crystalline phases of $TiO_2$, anatase, rutile and brookite, exhibit different chemical/physical properties, such as stability field, refraction indexes, chemical reactivities and behavior to irradiation with electromagnetic radiation. The use and performance of $TiO_2$ depends greatly on its crystalline phase, on its morphology and on the dimensions of the particles, as reported, for instance, by X. Chen and S. S. Mao in J. Nanosci. Nanotechnol, 6(4), 906-925, 2006. The phase composition, the shape of the crystals and the dimensions of the particles exert an enormous influence over the chemical/physical, mechanical, electronic, magnetic and optical properties of the end product.

It is desirable to provide a process to produce nanocrystalline, $TiO_2$ particles with a desired shape and high levels of specific surface.

SUMMARY OF THE INVENTION

The present invention is directed to the use of oxalic acid in the formation of $TiO_2$ nanorods via the complexation of $Ti^{4+}$ with $C_2O_4$. The present invention relates to a process for the preparation of linear crystals of $TiO_2$ by hydrothermal treatment of a titanium dioxide precursor, in the presence of oxalic acid and an alkali metal hydroxide, especially sodium hydroxide, in a sealed reactor with mechanical stirring and at a suitable average temperature. It was found that the additives of oxalic acid and sodium hydroxide (NaOH) promote the conversion of titanium tetraisopropoxide (TTIP) into a one-dimensional $TiO_2$ morphology. Nanorods with a high aspect ratio in the range of about 30 to about 200 were obtained when oxalic acid was first reacted with TTIP, followed by the addition of NaOH, in a one-pot synthesis.

The presence of oxalic acid, in conjunction with NaOH, clearly enhances the formation of nanorods and participates in the elongation of the nanorods themselves. The process of the present invention can be used for forming commercially desirable anatase, rutile, and rutile-anatase mixtures of nanorods using a simple hydrothermal technique.

BRIEF DESCRIPTION OF THE DRAWINGS

FIG. 1A is a SEM image showing high aspect ratio $TiO_2$ nanorods were obtained when oxalic acid, NaOH, TTIP, and $H_2O$ were present in accordance with the teachings of the present invention.

FIG. 1B is a SEM image showing spiked spherical particles were obtained when NaOH, TTIP and $H_2O$ were present in a comparative example.

FIG. 1C is a SEM image showing that short $TiO_2$ nanorods were obtained when NaOH, TTIP, and $H_2O$ were present in a comparative example.

FIG. 1D is a SEM showing that amorphous $TiO_2$ was obtained when only TTIP and $H_2O$ were present in a comparative example.

FIG. 1E is a SEM showing that $TiO_2$ flakes/plates were obtained when oxalic acid, NaOH, TTIP, and $H_2O$ were present and when the reaction was performed at room temperature in a comparative example.

FIG. 1F is a SEM showing that $TiO_2$ porous matrix was obtained when TTIP and $H_2O$ were present and when the reaction was performed at room temperature in a comparative example.

FIG. 2A. is a graph of XRD patterns of $TiO_2$ nanorods as a function of annealing temperature.

FIG. 2B. is a graph of XRD pattern of $TiO_2$ spiked spheres with no subsequent annealing. Anatase (o) and rutile (*) phases are denoted.

DETAILED DESCRIPTION

Reference will now be made in greater detail to a preferred embodiment of the invention, an example of which is illustrated in the accompanying drawings. Wherever possible, the same reference numerals will be used throughout the drawings and the description to refer to the same or like parts.

The terms "titanium dioxide precursor" or "precursor", herein used indifferently, refer to inorganic or organic titanium-containing compounds that that can form $TiO_2$ by means of known reactions, e.g. hydrolysis. Non-limiting examples of titanium dioxide precursor include for instance: titanium alkoxide, titanium halide, such as titanium tetrachloride, titanylsulphate, titanyl bis(acetylacetonate). Preferably, though not exclusively, the precursor is a titanium alkoxide, i.e. a compound $Ti(OR)_4$, wherein R is a $C_1$-$C_6$ alkyl group, e.g., titanium tetramethoxide, titanium tetraethoxide, titanium tetra n-propoxide, titanium tetraisopropoxide, titanium tetra n-butoxide and titanium tetra i-butoxide. Particularly preferred is titanium tetraisopropoxide.

The term "nanorods" refers to non-spherical, elongated particles, having a typical rectangular section when observed by SEM.

The process of the present invention comprises reacting a titanium precursor with aqueous oxalic acid in a molar ratio comprised between 1:1 and 1:5, preferably between 1:2 and 1:4, and most preferably 1:2 to form a titanium oxalate solution. NaOH is added to the titanium oxalate solution. Suitable ranges of NaOH concentrations are about 0.5M to about 1.5M by weight prior to hydrothermal treatment. The reaction can be carried out as a one-pot hydrothermal synthesis.

In one embodiment, the titanium oxalate solution is formed in a reactor. NaOH pellets can be added over time to the reactor with magnetic stirring. The reaction mixture is continuously stirred for a pre-determined time until the NaOH is fully dissolved. The reactor can be sealed and heated. In one embodiment, the vessel is placed in an oven at a temperature in the range of about 100° C. to about 200° C., preferably 150° C. Upon cooling, the product can be sequentially rinsed with an acid and water. Suitable acids include hydrochloric acid, nitric acid and sulfuric acid. The washed product is dried, such as at a temperature of about 50° C. to about 150° C., preferably 100° C.

The products were characterized by X-ray diffraction (XRD) and scanning electron microscopy. The results show that the starting titanium precursor was fully converted into nanomaterials with a lamellar titanate structure having the general formula $Na_xH_2$-$xTi_3O_7 nH_2O$. The resulting product formed was linear crystals of $TiO_2$ having nanorod characteristics and an aspect ratio in the range of about 30 to about 200.

The process of the present invention is distinguished by an improved, single-stage process procedure which dispenses with any intermediate isolation or intermediate purification stages, hereinafter referred to as "one-pot synthesis". The single-stage preparative process comprises, for the purposes of the present invention, the preparation of the $TiO_2$ nanotubes without any isolation of intermediates. The present invention therefore describes a process in which the target product is prepared in-situ from the starting materials in one reactor without costly and time-consuming intermediate isolations or intermediate purifications.

The invention can be further illustrated by the following examples thereof, although it will be understood that these examples are included merely for purposes of illustration and are not intended to limit the scope of the invention unless otherwise specifically indicated. All percentages, ratios, and parts herein, in the Specification, Examples, and Claims, are by weight and are approximations unless otherwise stated.

EXPERIMENTS

Oxalic acid, titanium tetraisopropoxide (TTIP), and sodium hydroxide pellets (NaOH) were obtained from Sigma Aldrich, Alfa Aesar, and Fisher Scientific, respectively. Additionally, 18.2 MΩ deionized water, obtained from a Millipore Direct-Q 5 system, was used in all experiments.

In a typical synthesis, titanium oxalate was first prepared by reacting TTIP with 0.364 M aqueous oxalic acid in a 1:2 molar ratio. Next, while magnetically stirring, 16 g of NaOH pellets were slowly added to a 125 mL Teflon-lined stainless steel autoclave containing 40 mL of the titanium oxalate solution. After ten minutes of continuous stirring, the NaOH was fully dissolved to and a gel-like consistency was observed. Next, the reaction vessel was tightly sealed and placed in an oven for 48 h at 150° C. Upon cooling, the product was sequentially rinsed with 1.0 L of 0.1 M HCl and 1.0 L of $H_2O$. Finally, the washed product was dried at 100° C. for 12 h yielding $TiO_2$ nanorods. All products were placed in a porcelain crucible and annealed in air, in a muffle furnace at temperatures ranging from 300-1100° C.

Powder X-ray diffraction (XRD) patterns of the products were recorded on a Panalytical X'Pert Pro diffractometer with Xcelerator, using Cu Kα radiation (λ=1.5406 Å) at 45 kV and 40 mA. Scanning electron microscopy (SEM) images of the products were obtained using a JEOL JCM- 5700 Scanning Electron Microscope. Samples were supported on double-sided carbon tape and sputter coated with gold prior to analysis. The instrument was operated in high vacuum mode using accelerating voltages of 2-15 kV at nominal working distances of 7-12 mm. Elemental analysis was also performed using energy-dispersive X-ray spectroscopy (EDX), which was an accessory to the JEOL JCM-5700 SEM. Comparative examples were performed with the following combinations of additives being present: oxalic acid, TTIP, and $H_2O$; NaOH, TTIP, and $H_2O$; TTIP and $H_2O$; NaOH, TTIP, and $H_2O$; and TTIP and $H_2O$.

High-aspect ratio nanorods with an average diameter of 160 nm and a major dimension ranging from 5-40 μm were formed using a one-pot synthesis containing TTIP, oxalic acid, and sodium hydroxide in accordance with the teachings of the present invention, as shown in FIG. 1A. Numerous comparative experiments were subsequently conducted. First, NaOH was omitted from the reaction vessel, while keeping all other experimental parameters the same. This comparative experiment yielded spiked spherical particles as demonstrated in the SEM image shown in FIG. 1B. A second comparative experiment involved the omission of oxalic acid from the reaction vessel, while keeping all other experimental parameters the same. This experiment yielded shorter nanorods as demonstrated in FIG. 1C. Inspection of the experimental parameters used to generate FIGS. 1A-IC indicate that NaOH is a prerequisite for the formation of rod shape morphologies, while oxalic acid in conjunction with NaOH is useful to further elongate the rods.

A comparative example was performed with the omission of both oxalic acid and NaOH from the reaction vessel. This experiment yielded spherical and largely amorphous particle morphologies, as demonstrated in the SEM image shown in FIG. 1D. This result confirmed the impact of both NaOH and oxalic acid on inducing non-spherical geometries.

Comparative examples were performed to investigate the impact of reaction vessel temperature, both in the presence and absence of both oxalic acid and NaOH. When oxalic acid and NaOH were present, an ambient reaction temperature interestingly yielded non-spherical platelet-structures as shown in FIG. 1E. The capacity of oxalic acid and NaOH to induce non-spherical geometry was still observed, albeit to a lesser extent. It was found that temperature, in conjunction with oxalic acid and NaOH, play a critical role in the elongation and formation of rod structures.

A comparative example was performed in which heat, oxalic acid, and NaOH were omitted from the reaction vessel, a porous matrix of largely spherical particles was observed as shown in FIG. 1F. This morphology is consistent with the morphology that is commonly observed when $TiO_2$ is fabricated using a sol-gel chemistry approach.

The XRD patterns for the high aspect ratio $TiO_2$ nanorods are provided in FIG. 2A. Anatase (o) and rutile (*) phases are denoted. The patterns in FIG. 2A represent the various temperatures at which the nanorods were annealed. Inspection of FIG. 2A clearly demonstrates that for annealing temperatures up to 500° C., an amorphous titanium oxalate type crystal structure was observed, i.e. there were no clear indications that either the anatase or rutile forms of $TiO_2$ were present. The anatase crystal form of $TiO_2$ began to appear at an annealing temperature of 700° C. XRD patterns associated with the rutile form of $TiO_2$ began to appear at an annealing temperature of 900° C., with anatase still being predominant. Finally, the rutile form was dominant at an annealing temperature of 1100° C.

FIG. 2B provides the XRD patterns of the spiked spheres shown in FIG. 1B obtained when NaOH was omitted from the reaction. The XRD spectra revealed the strong presence of the rutile crystal form of $TiO_2$, despite the fact no subsequent annealing was performed. These results are consistent with other results as described in [25], where the rutile form of $TiO_2$ was obtained in the presence of the oxalate ion, specifically when the molar ratio R=[oxalate]/[$Ti^{4+}$]=2.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A process for the preparation of $TiO_2$ nanorods, comprising the reaction of a titanium dioxide precursor with oxalic acid and an alkali metal hydroxide.

2. The process of claim 1, wherein the alkali metal hydroxide is NaOH.

3. The process of claim 1, wherein the titanium dioxide precursor is selected from the group consisting of: titanium alkoxide, titanium halide, titanium tetrachloride, titanylsulphate, titanyl bis(acetylacetonate), titanium alkoxide, titanium tetramethoxide, titanium tetraethoxide, titanium tetra n-propoxide, titanium tetraisopropoxide (TTIP), titanium tetra n-butoxide and titanium tetra i-butoxide.

4. The process of claim 3, wherein the titanium dioxide precursor is titanium tetraisopropoxide (TTIP).

5. The process of claim 1, wherein the process is a hydrothermal one-pot synthesis.

6. The process according to claim 1, wherein the nanorods have an aspect ratio in the range of about 30 to about 200.

7. The process of claim 1, wherein the process comprises first reacting the oxalic acid with the titanium dioxide precursor to form a titanium oxalate solution in a reactor and subsequently adding the alkali metal hydroxide to the reactor, wherein the alkali metal hydroxide is NaOH.

8. The process of claim 7, wherein during the addition of the NaOH the reactor is continuously stirred.

9. The process of claim 8, wherein after the alkali metal hydroxide is added to the reactor, further comprising the step of heating of the reactor to a temperature in the range of about 100 to about 300° C.

10. The process of claim 9, further comprising the step of cooling the product and rinsing the product with water and/or an acid.

11. The process of claim 10, wherein the product was sequentially rinsed with acid and water.

12. The process of claim 10, wherein the acid is selected from the group consisting of hydrochloric, nitric and sulfuric.

13. The process of claim 11, further comprising the step of annealing the product at temperatures ranging from about 300 to about 1100° C.

14. The process of claim 13, wherein the step of annealing the product is at a temperature in the range of 700° C. to 900° C. to form an anatase form of the $TiO_2$ nanorods.

15. The process of claim 13, wherein the step of annealing the product is at a temperature of about 1100° C. to form a rutile form of the $TiO_2$ nanorods.

* * * * *